Patented June 9, 1942

2,285,465

UNITED STATES PATENT OFFICE 2,285,465

YEAST PROPAGATION

Alfred S. Schultz and Lawrence Atkin, Bronx, and Charles N. Frey, Scarsdale, N. Y., assignors to Standard Brands Incorporated, New York, N. Y., a corporation of Delaware No Drawing. Application November 8, 1940, Serial No. 364,772

7 Claims. (Cl. 195—79)

The invention relates to the propagation of yeast, and a suitable wort therefor. More particularly, it is concerned with a method for the production of a yeast suitable for baking, and to a synthetic wort in which the yeast may be grown, and includes correlated improvements and discoveries whereby the propagation of yeast may be enhanced.

It has been shown previously that the production of a yeast of the baker's type may be facilitated when substances other than sugar and salts are present in the worts or media. Thus, Wildier has set forth that certain substances are contained in various worts or cereal extracts which enable the yeast more fully to utilize the energy and nutrient contained in carbohydrates and salts. He has pointed out that the introduction of a small amount of wort to a prepared mixture of sugar and salts would permit a growth comparable to that obtained by the use of wort alone.

The substances considered by Wildier to be necessary for the growing of yeast have been designated by him as "Bios". Following Wildier's announcement regarding "Bios," there was considerable confusion in the art as to whether yeast actually required the presence of such substances during its growth. With the discovery that the vitamins are essential for proper animal and human growth, attention was again given to the promotion of the growth characteristics of yeast, and a number of procedures were proposed in which vitamin-containing substances of varying kind were added to the wort. These vitamin-containing substances were as they occur in nature, and hence the vitamins were accompanied by associated compounds. Among the additions suggested were milk—liquid and solid—"rice polish," green vegetable matter, extracts of yeast and the like.

Moreover, it was demonstrated that the "Bios" material is not a single substance or compound, but rather a combination of substances and a fractionation thereof has been effected. Such a separation may be made by preparing an alcohol extract, e. g. of malt sprouts, molasses residues and distillery slop, and treating it with baryta. The precipitate contains one of the factors, and the filtrate may be further fractionated by shaking with a charcoal. One of the remaining factors is not absorbed, whereas another is. Hence, the crude material may be separated into three factors, which may be utilized in connection with the propagation of yeast. Subsequent work indicates that the first factor is in all probability inositol, and that the second factor is beta alanine, but the isolation of a particular substance or substances from the third factor has not been accomplished up to the present time.

An object of the present invention is the provision of a method whereby the growth of a yeast may be augmented and the yield increased.

A further object of the invention is to provide a method for the production of yeast in a synthetic wort or medium whereby increased yields of yeast having good color, baking and keeping qualities may be obtained.

An additional object of the invention is the provision of a method in which the content of growth promoting substances or factors in a wort is augmented by the addition of vitamin $B_1$.

Another object of the invention is the provision of a method for the propagation of yeast in a pure synthetic solution or wort containing carbohydrate material, salts and growth promoting substances, including vitamin $B_1$.

Other objects of the invention will in part be obvious and will in part appear hereinafter.

The invention accordingly comprises the several steps and the relation of one or more of such steps with respect to each of the others, which are exemplified in the following detailed disclosure, and the scope of the invention will be indicated in the claims.

In the practice of the invention propagation or growth of a *Saccharomyces cerevisiae* yeast may be effected in a wort or medium which may be synthetic or deficient in one or more growth promoting factors by adding to a medium of this character such growth promoting factors as are required to establish therein conditions which will lead to a full utilization of the carbohydrate and nutrient materials. We have found that when such a yeast is thus propagated, there is a full growth within the synthetic medium or wort. Thus, if a yeast which we designated as Fleischmann 189 yeast and which may be hereinafter referred to briefly as 189 is grown in a cane-beet molasses mixture, the utilization of wort materials is not as satisfactory as if a yeast of the Gebruder Mayer type were grown in such wort. The Fleischmann 189 yeast is characterized by being a *Saccharomyces cerevisiae* yeast of a distiller's type, of high baking strength and high protein and invertase content, having good keeping qualities and occasioning rapid fermentation of dextrose, sucrose and maltose.

However, if the wort is supplemented by the addition thereto of pure vitamin $B_1$ the yield of the 189 yeast is increased. Moreover, if this wort is further supplemented with a growth promoting factor present in tomato juice, i. e. factor X, the yield of the 189 yeast is further increased. Hence, the introduction of vitamin $B_1$ and factor X as additional growth promoting factors in the wort are of marked advantage for the obtainment of a high yield and effective utilization of the wort materials in the growing of the 189 yeast. Consequently a full growth of certain strains of yeast is accomplished not only when one or more of the three growth promoting factors previously mentioned are present, but rather only when additional factors are found in the wort, namely, pure vitamin $B_1$ and factor X.

The three factors mentioned hereinbefore may be designated as I, which is believed to be inositol; $II_A$, considered to be beta alanine; and $II_B$, of unknown composition. Factor $II_B$ may be produced by an extraction of cane distillery slop with butyl alcohol, methyl isobutyl ketone, or ethyl ether at a pH which is acid to Congo red. The preparation may also be brought about by concentrating molasses slop to 40° Balling, and precipitating salts by the addition of alcohol in an amount of about 80%. The alcohol is then evaporated; the residue taken up with water, and an activated carbon introduced thereinto at a pH acid to Congo red. The activated carbon absorbs the factor $II_B$ and this factor may be separated therefrom by elutriation with alcohol. Following distillation of the alcohol, the concentrated $II_B$ residue may be extracted with ethyl ether or methyl isobutyl ketone and the $II_B$ obtained therefrom by washing with water.

As a wort there may be employed a synthetic medium containing pure ingredients. Thus, pure carbohydrate, as cane sugar or dextrose; nutrient compounds, as ammonium salts, e. g. chloride, sulfate or phosphate; factor I, or inositol; factor $II_A$, or beta alanine; factor $II_B$; and synthetic vitamin $B_1$. In addition the wort may include factor X obtainable from tomato juice, grain extracts, yeast extracts, malt sprouts, and the like. A wort so prepared may be inoculated with yeast, for example about 20% of seed yeast, aeration initiated, and propagation carried through with continued aeration, with preferably a zulaufing of additional wort containing carbohydrate and nutrient salt materials.

As an illustrative embodiment of a manner in which the invention may be practiced commercially, the following examples are presented:

Example I

A wort may be prepared in the proportions of a solution having a volume of 30 cc. and containing yeast nutrient and buffer salts in an amount of 0.928 gram, chemically pure dextrose 2.0 grams, and a yeast, moist weight, 0.001 gram. The nutrient salt mixture may contain one or more of the following compounds—potassium dihydrogen phosphate, potassium chloride, calcium chloride, magnesium sulfate, potassium citrate, citric acid, ferric chloride and manganese sulfate. This mixture is utilized as a control mixture, and when shaken for 24 hours at 30° C. the yeast content was about 0.004 gram. Mixtures of such compositions were seeded with Gebruder Mayer yeast, and also with yeast 189. To the mixtures there was then added growth promoting factors I, (inositol) 0.001 gram; $II_A$ (beta alanine) 0.00005 gram; and $II_B$, a solution containing 0.000328 gram. At the end of 24 hours the yield of the Gebruder Mayer yeast was 1.0 gram, and that of the 189 yeast 0.1 gram. If the growth promoting factors are augmented by the introduction of crystalline vitamin $B_1$ in an amount of .00001 gram, there is not any additional effect upon the Gebruder Mayer yeast, but yield of the 189 yeast is increased to 0.5 gram, and if the wort is further supplemented through the inclusion therein of factor X, the growth of the 189 yeast will be substantially 1.0 gram

Example II

The effect of crystalline vitamin $B_1$, especially a synthetic vitamin $B_1$, is also shown by the following procedure. A wort containing carbohydrate and salt materials, as in Example I, also growth promoting factors I, $II_A$ and $II_B$, and seeded with 189 yeast gave the following results:

Addition materials:

| | Crop |
|---|---|
| None | 40 |
| 10 gamma vitamin $B_1$ | 120 |
| 1 gamma vitamin $B_1$ | 50 |

One gamma, as mentioned in the foregoing tabulation, equals 0.001 milligram. By means of a similar experiment it was shown that the effect upon a Gebruder Mayer yeast is not like that upon type 189.

Example III

The action of crystalline vitamin $B_1$ was also demonstrated with respect to protein yield, and vitamin $B_1$ content, in experiments in which 189 yeast was grown in a wort containing molasses seeded with about 20% of said yeast. The wort was aerated and carbohydrate and nutrient added in accordance with the zulaufing procedure. Propagation was effected at a temperature of about 30° C. The results obtained are given in the following tabulation:

| Addition materials | Protein on solids | Yield 27% solids | Int. units $B_1$ by gas | Total int. units $B_1$ by gas |
|---|---|---|---|---|
| None | 54.7 | 81 | 6 | 500 |
| 3000 gamma crystalline $B_1$ | 55.6 | 82 | 10 | 840 |

3 gamma are considered to be one international unit. These results indicate that the addition of crystalline vitamin $B_1$ to a wort in which yeast is grown effects a marked increase in the vitamin $B_1$ content of the yeast. It is our belief that the influence of vitamin $B_1$ is not due to an adsorption or absorption thereof, but that the vitamin $B_1$ is phosphorylated with the formation of cocarboxylase, and that the vitamin $B_1$ is taken up by and exists largely in the yeast in the phosphorylated condition.

There is accordingly thus provided a procedure whereby the growth characteristics of a yeast may be enhanced with an increase in yield and a substantially complete utilization of the energy and nutritive properties contained in the carbohydrate and salt constituents of the wort. Such result is accomplished by incorporating into a wort which is deficient in growth promoting factors, or into a synthetic carbohydrate salt wort, such growth promoting factors as are required to make up the deficiency and provide a balanced medium for yeast growth. The additional factors may be inositol, beta alanine, factor $II_B$, and synthetic vitamin $B_1$, all in preferably pure condition, and with which there may be utilized also factor X.

It will thus be seen that the factors synthetic $B_1$ and factor X are of marked advantage in the growing of a yeast, and that the invention, therefore, provides a ready means for controlling the growth of a yeast in synthetic media and in worts which have a deficiency of growth promoting factors.

This application is a continuation-in-part of our copending application Serial No. 141,858, filed May 10, 1937.

Since certain changes in carrying out the above process, and certain modifications in the wort which embody the invention may be made without departing from its scope, it is intended that all matter contained in the above description shall be interpreted as illustrative and not in a limiting sense.

Having described our invention, what we claim as new and desire to secure by Letters Patent is:

1. A method for the production of yeast, which comprises propagating a *Saccharomyces cerevisiae* Fleischmann 189 yeast under aeration, in a wort containing a yeast assimilable carbohydrate, a yeast nourishing inorganic salt, growth promoting factors inositol, beta alanine, $II_B$, and synthetic vitamin $B_1$.

2. A method for the production of yeast, which comprises propagating a *Saccharomyces cerevisiae* Fleischmann 189 yeast in a wort containing a yeast fermentable carbohydrate, a yeast nourishing inorganic salt, inositol, beta alanine and vitamin $B_1$ all in chemically pure condition, and growth promoting factor $II_B$.

3. A method for the production of yeast, which comprises propagating a *Saccharomyces cerevisiae* Fleischmann 189 yeast under aeration, in a wort containing a yeast assimilable carbohydrate, a yeast nourishing inorganic salt, growth promoting factors inositol, beta alanine, $II_B$, X and synthetic vitamin $B_1$.

4. A method for the production of *Saccharomyces cerevisiae* Fleischmann 189 yeast, which comprises incorporating into a wort deficient in growth promoting factors crystalline vitamin $B_1$.

5. A method for the production of *Saccharomyces cerevisiae* Fleischmann 189 yeast, which comprises incorporating into a wort deficient in growth promoting factors crystalline $B_1$, and growth promoting factor X.

6. A method for increasing the vitamin $B_1$ content of a yeast, which comprises propagating *Saccharomyces cerevisiae* Fleischmann 189 yeast in a wort containing synthetic vitamin $B_1$.

7. A method for the production of *Saccharomyces cerevisiae* Fleischmann 189 yeast, which comprises incorporating a growth promoting factor belonging to the group consisting of inositol, beta alanine and vitamin $B_1$ in pure form and factor $II_B$ into a wort deficient in such factor in an amount sufficient to make up such deficiency.

ALFRED S. SCHULTZ.
LAWRENCE ATKIN.
CHARLES N. FREY.